United States Patent [19]

Lewis

[11] Patent Number: 5,361,592

[45] Date of Patent: Nov. 8, 1994

[54] REFRIGERANT CONSERVATION SYSTEM

[75] Inventor: Gordon A. C. Lewis, Ronkonkoma, N.Y.

[73] Assignee: Conair Corporation, Garden City Park, N.Y.

[21] Appl. No.: 214,538

[22] Filed: Mar. 18, 1994

Related U.S. Application Data

[62] Division of Ser. No. 83,304, Jun. 29, 1993.

[51] Int. Cl.$^5$ ................................................ F25B 9/00
[52] U.S. Cl. ........................................ 62/86; 62/174; 62/149
[58] Field of Search ............... 62/149, 174, 222.3, 62/DIG. 17, 86

[56] References Cited

U.S. PATENT DOCUMENTS

| | | |
|---|---|---|
| 1,703,299 | 2/1929 | Copeman . |
| 1,815,962 | 7/1931 | Andrews . |
| 3,238,737 | 3/1966 | Shrader et al. . |
| 3,400,552 | 9/1968 | Johnson et al. . |
| 3,736,763 | 6/1973 | Garland . |
| 3,903,709 | 9/1975 | Anderson et al. . |
| 5,186,017 | 2/1993 | Hancock et al. . |
| 5,259,204 | 11/1993 | McKeown ............................ 62/174 |

FOREIGN PATENT DOCUMENTS

| | | |
|---|---|---|
| 250914 | 1/1988 | European Pat. Off. . |
| 428967 | 1/1992 | Japan . |

*Primary Examiner*—John M. Sollecito
*Attorney, Agent, or Firm*—Fisher, Christen & Sabol

[57] ABSTRACT

The present invention provides a refrigerant conservation system and method for preventing the release of refrigerant to the atmosphere during high pressure system failure. Refrigerant is delivered from the refrigerant loop of the refrigerant system to an evacuated sealed receiver. The receiver tank may be retrofitted to the existing high pressure safety relief valve of a mechanical refrigeration system. When the pressure in the receiver tank exceeds a predetermined value, operating current is denied to the compressor to prevent its operation and to contain refrigerant within a closed system which would otherwise be discharged into the atmosphere.

5 Claims, 2 Drawing Sheets

REFRIGERANT CONSERVATION SYSTEM

This is a divisional of application Ser. No. 08/083,304, filed on Jun. 29, 1993.

FIELD OF THE INVENTION

The present invention relates to a method and apparatus for preventing the release of refrigerant to the atmosphere.

BACKGROUND OF THE INVENTION

In conventional refrigeration systems, if pressure buildup within the system exceeds a predetermined value, a safety valve will open to release refrigerant to the atmosphere. This relieves pressures within the system and therefore avoids damage to the refrigeration system and a possible explosion. A refrigeration system which employs a safety valve (23) which releases refrigerant to the atmosphere is disclosed in U.S. Pat. No. 1,703,299 to Copeman.

However, release of refrigerants to the atmosphere, while saving the equipment, unfortunately may contribute to pollution of the atmosphere. The U.S. and more than 80 other countries have reached a pact to halt the production of chlorofluorocarbons, or CFC's after 1995. The leading coolants slated for replacing CFC's in the next generation of industrial air conditioners, or chillers, are HFC 134a and HCFC 123. Even these CFC substitutes have been accused of exhibiting some global warming effect, or small ozone-depletion effect, or causing benign tumors in rats. CFC's may be used after the production deadline, but costs for the refrigerants will greatly increase as the supply decreases. CFC's have already increased from about 50 cents a pound ten years ago to about $7.00 per pound. It is estimated that the pool of CFC's after the ban on production will supply only about 25% of current needs.

Thus, there exists a great need for conserving refrigerant, whether it be the banned CFC's or their proposed replacements, both from an ecological view and from an economic one.

European patent no. 250,914 employs a valve 8 and a container 1 downstream of the valve to collect refrigerant and prevent the refrigerant from being released to the atmosphere during refrigerant draining.

Japanese patent no. 28,967 discloses an expansion tank 11 which communicates with the high pressure side of the refrigerant system via line 17. The tank is connected to the inlet of a compressor by a capillary tube 14 and a check valve 15. A valve is opened when a discharge pressure of the compressor exceeds a specified value. The valve actuator 13 is controlled by element 12 which in turn communicates with the discharge of the compressor 1.

U.S. Pat. No. 5,186,017 to Hancock et al employs tanks 16 (FIGS. 1 and 2) and 316 (FIGS. 6 to 8) to accept refrigerant from the high pressure side of the refrigerant system. Condition responsive controlled compressors 172 (FIGS. 1 and 2) and 372 (FIGS. 6 to 8) return vapor from the tank to the refrigerant system.

U.S. Pat. No. 3,736,763 to Garland illustrates the employment of condition responsive control means (FIG. 2) to control a compressor motor 28 and valves 21, 37 and 39 in response to pressure switches 38 and 40 which communicate with receiver 16. The tank 33 located between valves 37 and 39 contains a non-condensible gas.

U.S. Pat. No. 3,238,737 to Schrader et al discloses (FIG. 2A) a check valve 26 which releases refrigerant from liquid line 13A to a tank 17 (column 4, lines 27 to 53).

U.S. Pat. No. 1,815,962 to Andrews discloses a pressurized refrigerant container 40 to charge the refrigerant system. The patent also discloses opening valve 38 to allow the compressor 20 to pump reserve from the evaporator into the receiver.

However, none of these references disclose shutting down the compressor and collecting refrigerant which would be released to the atmosphere if it were not collected during a high pressure system failure.

The present invention provides a method and apparatus for delivering refrigerant from the high pressure and/or low pressure side of the refrigerant system to an evacuated sealed receiver and denying operating current to the compressor to prevent its operation when the high pressure safety valve opens so as to contain refrigerant which would otherwise be discharged into the atmosphere.

SUMMARY OF THE INVENTION

The present invention provides an apparatus and method for preventing the release of refrigerant to the atmosphere during a high pressure safety release situation encountered in a mechanical refrigeration system. A refrigerant receiver tank is connected to the high pressure side and/or low pressure side of the mechanical refrigeration system for receiving refrigerant during the high pressure safety relief situation. A high pressure safety relief situation occurs when the pressure on the high pressure side or low pressure side exceeds a first predetermined value which is higher than the safe operating pressure of the mechanical refrigeration system. To relieve the excessive refrigerant pressure, normally the refrigerant would be released to the atmosphere through a safety relief valve. In the present invention, the system is relieved of the pressure by releasing the refrigerant into the refrigerant receiver tank rather than into the atmosphere.

Further operation of the compressor of the mechanical refrigeration unit is prevented when the pressure in the receiver tank exceeds a second predetermined value. The second predetermined value is substantially lower than the safe operating pressure of the side of the mechanical refrigeration unit to which the receiver tank is connected. Thus, the pressure on the high pressure side is relieved by release of refrigerant to the receiver tank and the system is shut down so as to reduce the overall pressure in the system without release of refrigerant to the atmosphere. In preferred embodiments of the present invention, the receiver tank is connected to the high pressure side via the existing high pressure safety relief valve or blow-out valve of the mechanical refrigeration system.

The receiver tank may have a capacity which is sufficient to contain at least 5% by weight, preferably from about 8% by weight to about 15% by weight of the refrigerant capacity of the mechanical refrigeration system. In preferred embodiments, the receiver tank receives refrigerant from the high pressure gaseous or vapor side of the mechanical refrigeration system. However, in other embodiments of the invention, the receiver tank may be connected via a refrigerant conduit to the high pressure liquid side of the mechanical refrigeration system, to the low pressure side or to wherever a safety relief valve would otherwise release refrigerant to the atmosphere.

Under normal operating conditions, flow of refrigerant to the receiver tank is prevented, and the refrigerant pressure in the receiving tank is preferably less than about 1 psig. In embodiments of the invention, when a safety relief situation occurs, refrigerant pressure on the high pressure side may exceed the set point or blow-off pressure on a pressure relief valve. The set point may, for example, be 200 psig or higher. The excessive pressure causes the relief valve to open, thereby permitting flow of refrigerant from the high pressure side through a refrigerant conduit to the receiver tank. The flow of refrigerant into the receiver tank causes the pressure in the tank to increase. When the pressure in the receiver tank exceeds a predetermined value which may be less than about 10 psig, preferably less than or equal to about 5 psig, further operation of the compressor is prevented.

Preventing the operation may be achieved by means of a reverse acting low pressure switch which is attached to the receiver tank. Activation of the switch when the pressure in the receiving tank exceeds a predetermined pressure results in the denial or cutting off of operating current to the compressor. In addition to cutting line voltage to the compressor, current to the fans and other electrical devices may be cut off.

The refrigerant conservation system of the present invention may be used for preventing the release of refrigerant to the atmosphere from mechanical refrigeration systems such as chillers, home air conditioning units, heat pumps, auto air conditioners, reciprocating refrigeration systems, centrifugal refrigeration systems, marine systems or any other closed loop mechanical refrigeration system containing a pressure activated device to release gases to the atmosphere.

BRIEF DESCRIPTION OF THE DRAWINGS

The drawings illustrate the present invention but do not limit its scope.

DETAILED DESCRIPTION OF THE INVENTION

The present invention provides a refrigerant conservation system and method for preventing the release of refrigerant to the atmosphere from a mechanical refrigeration system during a high pressure safety relief situation or high pressure failure. The refrigerant conservation system and method are applicable to existing refrigeration systems as well as to new installations. Mechanical refrigeration includes those processes in which the refrigerant is recovered and recirculated. In a vapor-compression system, a compression machine is used which may have either a positive-displacement mechanism (reciprocating or rotary compressor) or an impeller (centrifugal compressor). In the present invention, refrigerant which would normally be released to the atmosphere is collected in a refrigerant receiver tank. The resulting increase in pressure in the receiver tank activates an electrical switch which denies operating current to the compressor of the mechanical refrigeration system so that further refrigerant compression is ceased. The activation of the switch may also be used to deny operating current to fans, motors, and other electrical equipment to partially or completely shut down the refrigeration system.

Exemplary mechanical refrigeration systems which may be modified or retrofitted to conserve refrigerant in accordance with the present invention include residential, commercial, and automotive air conditioning systems, marine systems, heat pumps, reciprocating, rotary, and centrifugal compressor systems and chillers. Refrigerants which may be conserved in accordance with the present invention include all man-made refrigerants such as freon 12 or other CFC's, HFC 134a and HCFC 123.

Figure 1:
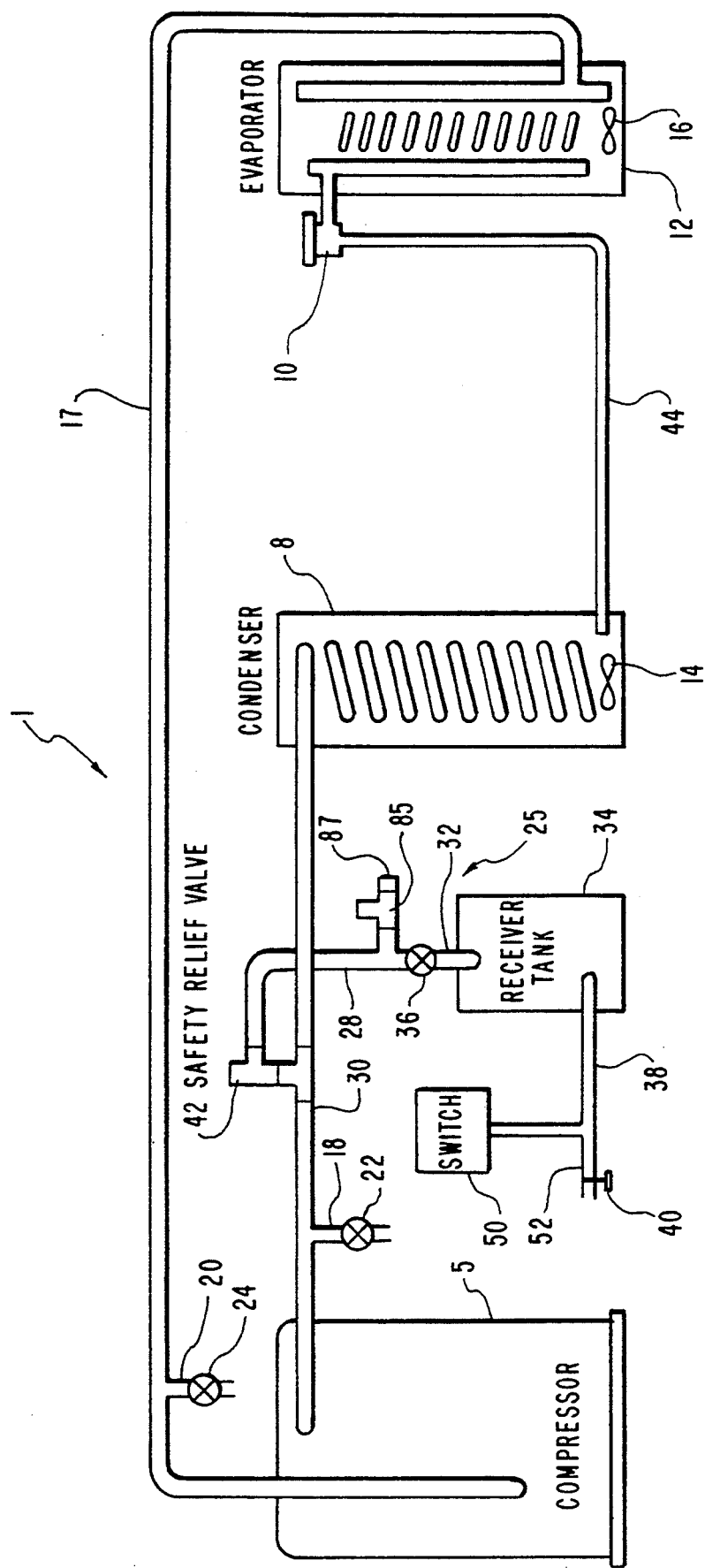
FIG. 1 is a schematic showing a safety relief refrigerant conservation system in accordance with the present invention.

As shown in FIG. 1, a mechanical refrigeration system 1 comprises a closed loop system having four primary components. These four primary components are a compressor 5, a condenser 8, an expansion valve 10 and an evaporator 12. In operation, a fluorocarbon refrigerant flows through the closed loop system. The refrigerant is compressed from a low pressure gaseous state to a high pressure gaseous state by compressor 5. Refrigerant leaves the compressor 5, and flows into the condenser 8. The condenser 8 serves as a heat exchanger, and is functionally similar to an automobile radiator. A fan 14 draws air through the condenser 8 to remove heat from the condenser 8, to thereby facilitate the condensation of the compressed vapor into a cooled, liquified refrigerant. The cooled, liquified refrigerant then flows through expansion valve 10. Expansion valve 10 regulates the flow of refrigerant into the evaporator 12. During the evaporation process, the refrigerant expands into its gaseous state, absorbing heat in the process.

The refrigerant then passes through evaporator 12. Evaporator 12 serves also primarily as a heat exchanger, and may have a construction similar to or identical to condenser 8. A fan 16 draws air through evaporator 12. The contact of the air and the evaporator 12 cools the air. This cooled air can then be transported by appropriate ducts into the space to be cooled, such as the interior of the building, house, or refrigerator to be cooled. Refrigerant is returned to the compressor 5 via the low pressure side or suction line 17.

A heat pump system works similarly to a mechanical refrigeration system 1, and is configured similarly to a mechanical refrigeration system 1. The primary difference between a heat pump and a standard mechanical refrigeration system is that a heat pump includes means to reverse the flow of refrigerant in the system, so that during a heating cycle, the heat exchanger that serves as a condenser during an air conditioning cycle serves as an evaporator during a heating cycle. The heat exchanger that serves as an evaporator during an air conditioning cycle serves as a condenser during a heating cycle.

The mechanical refrigeration system 1 may include a high pressure port 18 disposed downstream from the compressor 5, and a low pressure port 20 disposed upstream from the compressor 5. Refrigerant can be introduced into, and removed from the mechanical refrigeration system 1 through the high pressure port 18 and low pressure port 20. The high pressure port 18 typically includes a coupling member 22 to which a line can be coupled to introduce refrigerant to, or remove refrigerant from the high pressure port 18. Low pressure port 20 also includes a similar coupling member 24.

The refrigerant recovery system 25 includes a refrigerant conduit 28 that extends between the high pressure vapor or gas line 30 of the mechanical refrigeration system 1, and the inlet port 32 of the receiver or storage tank 34 by means of an optional coupling device or valve 36. The storage tank 34 may be a conventional type used in refrigeration systems, such as those approved by ASHRAE, OSHA or Underwriter's Lab. The storage tank 34 includes an outlet 38 having a user actuable valve 40 for charging or discharging refrigerant.

In embodiments of the present invention, the refrigerant receiver tank 34 may be connected via its inlet 32 to the high pressure gaseous side 30 of the mechanical refrigeration system 1 by means of a refrigerant conduit 28 and an existing safety relief valve or blow out valve 42. The safety valve 42 is placed in fluid communication with the high pressure side and with the receiver tank 34. The safety relief valve 42, which may be in or connected to the refrigerant conduit 28 prevents the flow of refrigerant to the receiver tank 34 unless the pressure on the high pressure side exceeds a first predetermined value which is higher than the safe operating pressure of the high pressure side of the mechanical refrigeration system.

As shown in FIG. 1, the receiver tank 34 may be connected via the refrigerant conduit 28 to an existing or pre-installed safety or blow out valve 42. In retro-fitting existing refrigeration systems, this is a preferred connection provided that sufficient space is available for making the connections. If connection cannot be made to the existing safety relief valve or blow out valve, connection can be made at any convenient point on the high pressure side of the mechanical refrigeration system. In this instance, connection may be made through a new safety relief valve or blow out valve which is set to open at a pressure which is lower than the safety relief or blow out pressure of the existing valve. This arrangement results in diversion of the refrigerant into the receiver tank via the refrigerant conduit rather than through the safety relief or blowout valve into the atmosphere. The refrigerant receiver may be attached via the refrigerant conduit to the high pressure gaseous or vapor side, such as line 30, between the compressor 5 and condenser 8 as shown in FIG. 1. Connection may also be made to the high pressure liquid side, such as at line 44 between the condenser 8 and evaporator 12 or to wherever an existing safety valve for release of refrigerant to the atmosphere is located. For example, connection may be made to the high pressure side and/or to the low pressure side of a centrifugal refrigeration system. The safety relief or blow out valve is preferably resettable. Existing non-resettable valves, such as safety plugs are preferably replaced with a resettable safety valve.

The safe operating pressure of the high pressure side of the mechanical refrigeration system 1 will depend upon the particular size and design of the unit. Safe operating pressures may, for example, range up to about 500 psig. A safety valve or blow out valve 42 may, for example, be set to open when the pressure on the high pressure side exceeds 200 psig, 300 psig, 400 psig, or the like. In any event, when the pressure on the high pressure side exceeds a first predetermined value which is higher than the safe operating pressure of the high pressure side, the safety or blow out valve 42 opens and permits flow of refrigerant via the refrigerant conduit 28 into the receiver tank 34. Prior to permitting flow of refrigerant to the receiver tank 34 in the pressure relief situation, the receiver tank 34 is preferably evacuated and charged with refrigerant to a pressure of up to about atmospheric pressure. The receiver tank 34 may be charged to a pressure higher than atmospheric but it decreases its surge capacity. The receiver tank 34 may have a capacity which is sufficient to contain at least about 5% by weight, preferably from about 8% by weight to about 15% by weight of the refrigerant capacity of the mechanical refrigeration system 1.

As the receiver tank 34 receives refrigerant under a high pressure safety relief situation, the pressure in the receiver tank 34 increases. When the pressure in the receiver tank 34 exceeds a predetermined value which is substantially lower than the safe operating pressure of the high pressure side, a reverse acting low pressure switch 50 which is attached to the receiver tank 34 is activated. Activation may be set to occur at less than about 10 psig, preferably less than or equal to about 5 psig, but above the normal or safe charging pressure of the receiving tank 34. The reverse acting low pressure switch 50 may be set at, for example, 1 psig. The low pressure switch 50 may be connected to the outlet 38 of the receiver tank 34 by means of a refrigerant line 52 which may be used to remove or charge refrigerant into the receiver tank 34. The refrigerant line 52 may be accessed via a service valve 40.

Figure 2:
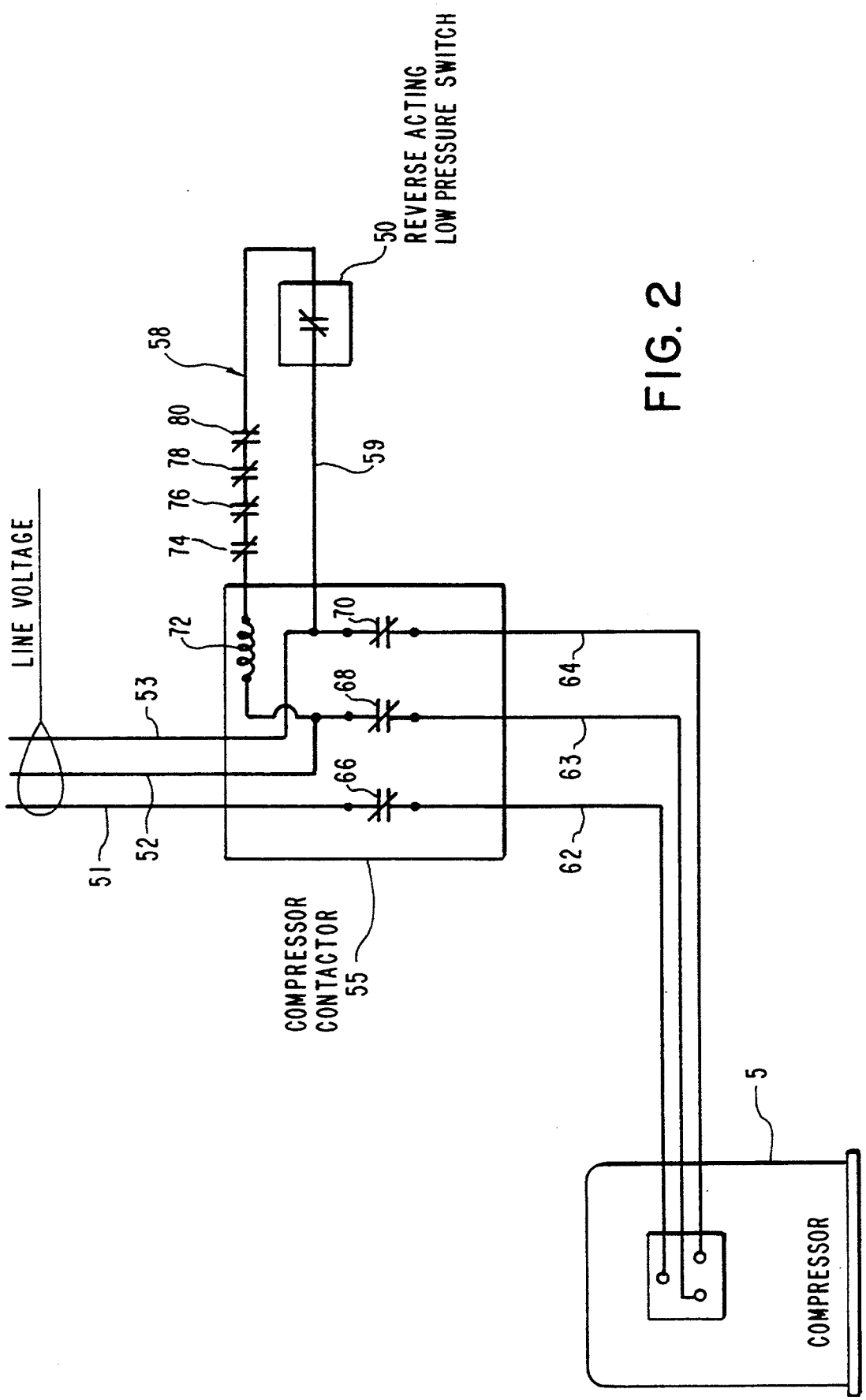
FIG. 2 is a schematic electrical wiring diagram which may be used with the safety relief refrigerant conservation system of the present invention.

As illustrated in FIG. 2, upon opening of the reverse acting low pressure switch 50, operating current from lines 51, 52, and 53 to the compressor 5 may be denied by means of a compressor contactor or electrical relay device 55. The compressor contactor 55 may be electrically connected via lines 58, 59 to switch 50 and via lines 62, 63, and 64 to compressor 5. The compressor contactor 55 may comprise several relays or switches 66, 68, and 70 and a magnetic holding coil 72 which operate at any conventional voltage or phase, such as 110 volts, 220 volts or 440 volts. Line 58 may include conventional switches or controls such as low pressure switch 74, high pressure switch 76, thermostat 78 and motor overload 80 electrically connected between switch 50 and contactor 55. Conventional reverse acting low pressure switches 50 and contactors or relays 55, such as produced by Honeywell Controls, may be used to deny operating current to the compressor 5. The controls may be DC control circuits, low voltage AC control circuits, and the like. Pneumatic controls may also be used. Operating current may be similarly denied to fans, motors, and other electrical components. Denying operating current to the compressor 5 prevents further operating of the refrigeration unit 1 and any further rise in discharge pressure.

The captivated refrigerant, such as freon 12 will remain in the receiver tank 34 and the unit will not run until a service technician repairs the cause of the high pressure safety relief or blow out conditions. The refrigerant is recharged into the system 1, via the service valve 40, for example, or via other refrigerant charging or discharging ports. The pressure in the receiver tank 34 is dropped to below the set point of the reverse acting low pressure switch 50 to permit the compressor to operate. The set point of the low pressure switch 50 may, for example, be about 1 psig or below.

As shown in FIG. 1, the refrigerant conservation system 25 of the present invention may include a further safety relief valve 85 in the refrigerant conduit 28 which connects the high pressure side to the refrigerant receiver tank 34. The further safety relief valve or blow out valve 85 is arranged so that it does not prevent flow of refrigerant to the receiver tank 34 but permits release of the refrigerant to the atmosphere via outlet 87 if the pressure in the refrigerant line 28 exceeds a predetermined value which substantially exceeds the pressure at which the existing safety or blow out valve 42 opens to permit flow of refrigerant to the receiver tank 34. The predetermined pressure relief point for the further relief valve 65 may exceed the pressure set point for the existing pressure relief valve 42 by, for example, at least about 25 psig. Exemplary set points for opening are 300 psig for existing safety valve 42, 350 psig for further safety valve 65, and 5 psig for switch 50 with a reset at 1 psig. The normal or safe charging pressure may be 0 psig (1 atm) for the receiver tank 34. The refrigerant capacity of the receiver tank 34 may be about 10% by weight of the system refrigerant charge.

What is claimed is:

1. A method for preventing the release of refrigerant to the atmosphere from a mechanical refrigeration system during a high pressure safety relief situation comprising:
   a) providing a refrigerant receiver tank for receiving refrigerant from the high pressure side of the mechanical refrigeration system,
   b) preventing the flow of refrigerant to the receiver tank unless the pressure on the high pressure side exceeds a first predetermined value which is higher than the safe operating pressure of the high pressure side of the mechanical refrigeration system,
   c) collecting refrigerant in said receiver tank from said high pressure side when the pressure on the high pressure side exceeds said first predetermined value, and
   d) preventing further operation of the compressor of the refrigeration system when the pressure in said receiver tank exceeds a second predetermined value which is substantially lower than the safe operating pressure of the high pressure side.

2. A method as claimed in claim 1 wherein said receiver tank has a capacity which is sufficient to contain at least about 5% by weight of the refrigerant capacity of the mechanical refrigeration system, and the receiver tank receives refrigerant from the high pressure gaseous or vapor side of the mechanical refrigeration system.

3. A method as claimed in claim 1 wherein after flow of refrigerant to the receiver tank, refrigerant is released to the atmosphere if the pressure on the high pressure side exceeds a third predetermined value which substantially exceeds said first predetermined value.

4. A method as claimed in claim 1 wherein when flow to said receiver tank is prevented, the refrigerant pressure in said receiver tank is up to about one atmosphere.

5. A method as claimed in claim 1 wherein said first predetermined value is at least about 200 psig, and said second predetermined value is less than about 10 psig.

* * * * *